United States Patent [19]

Ruben et al.

[11] 4,207,766
[45] Jun. 17, 1980

[54] ATTITUDE COMPENSATING LIQUID CONTENT INDICATOR

[75] Inventors: Samuel Ruben, New Rochelle, N.Y.; Philip E. Kalker, Northvale, N.J.

[73] Assignee: eMDee Corporation, Northvale, N.J.

[21] Appl. No.: 824,046

[22] Filed: Aug. 12, 1977

[51] Int. Cl.² ............................................. G01F 23/18
[52] U.S. Cl. ..................................... 73/301; 73/719; 73/734
[58] Field of Search ............... 73/301, 407 PR, 412, 73/398 AR, 719, 734; 338/40; 324/125, 146, 140 R

[56] References Cited

U.S. PATENT DOCUMENTS

| | | | |
|---|---|---|---|
| 1,285,145 | 11/1918 | Harrington et al. | 73/301 X |
| 1,705,158 | 3/1929 | McCoy | 324/146 X |
| 2,004,421 | 6/1935 | Smulski | 73/313 X |
| 2,333,406 | 11/1943 | Ballard | 73/313 X |
| 2,339,021 | 1/1944 | Lingel | 324/125 |
| 2,883,623 | 4/1959 | Hastings et al. | 324/140 R |
| 2,985,019 | 5/1961 | Colvin | 73/407 PR X |
| 3,013,233 | 12/1961 | Bourns | 338/40 |
| 3,013,234 | 12/1961 | Bourns | 338/40 |
| 3,092,916 | 6/1963 | Kendziorek et al. | 73/301 X |
| 3,247,716 | 4/1966 | Ranke | 73/412 X |
| 3,630,087 | 12/1971 | Ogden | 73/412 |
| 3,640,134 | 2/1972 | Hop | 73/301 X |

Primary Examiner—Daniel M. Yasich
Attorney, Agent, or Firm—David A. Jackson

[57] ABSTRACT

A liquid container is provided with paired variable resistors fluidly connected to the container at opposite ends of the bottom thereof. The resistors are electrically interconnected in series, and the output comprising the sum of the resistances is directly received by an electric current-responsive measuring device. Each of the resistors is weight-responsive and varies individually according to local liquid depth, however, the total resistance for a particular quantity of liquid in the container is always constant. The indicator of the present invention is particularly useful for measuring liquid content in containers subject to movement and change in attitude, such as, for example, gasoline tanks in motor vehicles.

5 Claims, 2 Drawing Figures

4,207,766

ATTITUDE COMPENSATING LIQUID CONTENT INDICATOR

BACKGROUND OF THE INVENTION

The present invention relates to a liquid lever meter which will provide an accurate reading regardless of tilts or changes in horizontal attitude.

Prior art efforts in the present area include such patents as U.S. Pat. No. 1,285,145 and U.S. Pat. No. 3,640,134.

The prior art, as represented by the above, suffers from such shortcomings as the use of non-continuous variable resistances and cmplexity of circuit design which, typically, involves a measurement of differences in resistances and not, as in the present case, a sum of pressure variable resistances. These shortcomings in the prior art have limited the usefulness of such approaches because of the poor accuracy, limited reliability, and high cost of manufacture which they have involved. The present invention represents a response to these shortcomings in the art.

SUMMARY OF THE INVENTION

An indicator for measuring the liquid content of a container is provided which comprises a weight-responsive attitude correcting sensing assembly comprising paired weight-responsive variable resistors disposed in fluid connection with the bottom of the container. The resistors are located at opposite ends of the container and are electrically connected to each other in series. The total resistance developed by the sensing assembly, comprised of the sum of the resistances of the individual variable resistors, remains constant for a particular quantity of liquid at all times regardless of the distribution of the liquid within the container.

The sensing assembly is directly electrically connected to an electric current-responsive meter calibrated to indicate liquid content. The indicator of the present invention is operated by connection to an appropriate voltage supply, such as a storage battery or the like. The exact construction of the meter useful in accordance with the present invention may vary, and in one embodiment, may include meters adapted to compensate for variations in the output of the voltage supply.

DETAILED DESCRIPTION OF THE INVENTION

The present apparatus is a liquid content indication which measure the volume of liquid in a container independent of the disposition of the liquid contained therein.

The present invention involves the use of two variable weight-responsive resistors in electrical series connection, and controlled by weight-sensitive elements which are fluidly connected to the bottom of the liquid container.

Figure 1:
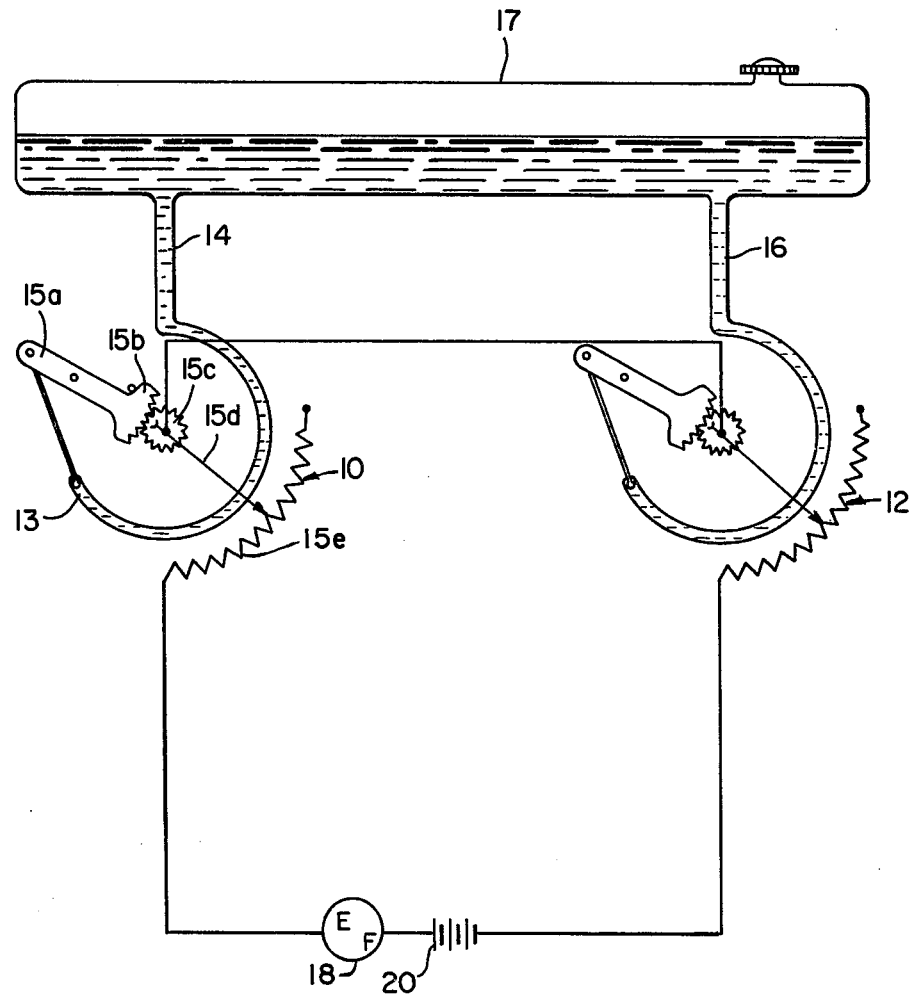
FIG. 1 comprises a schematic view of one embodiment of the present invention.

Referring now to FIG. 1, weight-responsive resistors 10 and 12 are positioned at opposite ends of liquid container 17 such that a change from the horizontal, with its consequential shifting of the contained liquid to the low side, will cause a decrease in value at the low-side resistor, said decrease being equal to an increase in value at the high-side resistor. The sum of the two resistance values obtained through their series connection will of course remain constant, this constant value being established by the value read from the tank when in its horizontal position.

In a first embodiment illustrated in FIG. 1, the weight-sensitive elements 14 and 16 may comprise Bourdon tube gauges. A Bourdon tube gauge is essentially a metal tube having a flattened oval section which is bent to a curve, the free end 13 being closed and the fixed end open to the pressure. The pressure tends to straighten the bent tube, and its consequent movement is communicated by means of a linkage 15a, a toothed sector 15b and a pinion 15c, to the axis of a needle or pointer 15d comprising a rheostat arm which, by its movement along rheostat 15e, varies the output of resistor 10. Resistor 12 is identical in construction to resistor 10 and operates in the same manner. Inasmuch as the Bourdon tube gauge responds to the weight pressure of the liquid, the present measuring device will not be affected by changes in atmospheric pressure upon the surface of the liquid. In other words, a Bourdon tube gauge responds only to the specific gravity of the liquid within the container 17 and, accordingly, variations in atmospheric pressure will not produce any noticeable effect upon the mechanical output of the electric current-responsive meter attached thereto.

Figure 2:
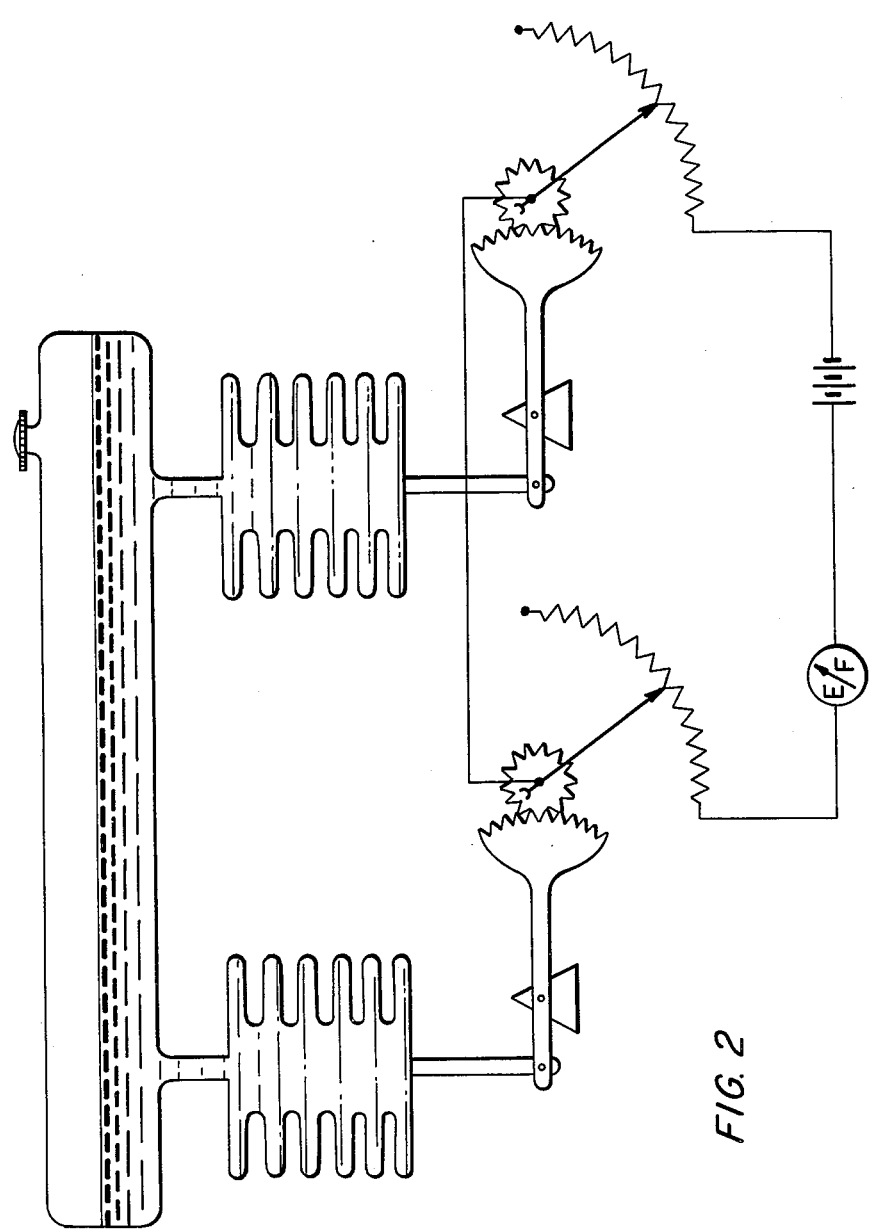
FIG. 2 comprises a schematic view illustrating another embodiment of the present invention.

As an alternative to the use of Bourdon tube gauges, other weight-sensitive devices, such as aneroid bellows, may be advantageously utilized. Referring now to FIG. 2, an alternate weight-responsive sensing assembly is schematically shown, which comprises paired aneroid bellows 11 and 19, which operate essentially as Bourdon tubes 14 and 16. Thus, each of the bellows units is connected by a similar mechanical linkage to a rheostat which operates in a manner comparable to that disclosed with respect to the Bourdon tubes, above. Accordingly, increased liquid weight impinging on the bellows results in an expansion thereof which moves the rheostat arm to reduce the resistance output of the rheostat. As illustrataed herein, bellows 19 is mechanically connected to an identical rheostat linkage, and the respective rheostats are electrically connected in the same manner illustrated in FIG. 1.

With further regard to FIG. 1, there is provided an electric-current responsive meter calibrated to indicate liquid content and schematically represented by fuel gauge 18 which is compensated with respect to possible changes in output from an emf or battery 20.

Such meter structure is well known in the art as illustrated in U.S. Pat. No. 2,004,421 to Smulski, the disclosure of which is incorporated herein by reference. As indicated earlier, however, the invention is not limited to the employment of the meter represented in FIG. 1 and disclosed in Smulski, but rather encompasses all metering devices which are operable in response to variations in electric current.

As noted earlier, the indicator of the present invention is useful as a fuel meter. In this regard, as fuel is consumed, decreasing in total volume the fuel contained, the compensated sum of the resistances of the two measuring elements will be affected such that the total resistance will be proportionately increased, therein decreasing the total amount of current passing through the circuit of the meter 18. Thus, the meter reading will always bear a direct linear proportionality to the liquid level in the container 17.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of the invention within the scope of the appended claims.

Having thus described our invention, what we claim as new, useful and non-obvious and accordingly secure by Letters Patent of the United States is:

1. An indicator apparatus for measuring the liquid contents of a container which comprises a weight-responsive, attitude correcting sensing assembly, said sensing assembly comprising paired, weight-responsive variable resistors disposed in fluid connection with said container, each of said resistors comprising a fluid chamber extending from the bottom of said container, said chamber including at least one movable wall which moves in response to change in the weight of said liquid, a rheostat including a mechanical resistance output adjustment means, and a rheostat linkage means mechanically connecting said movable wall and said adjustment means to transmit the movement of said movable wall to move said adjustment means to vary said resistance output, said resistors located at opposite ends of said bottom and electrically connected to each other by direct series connection extending between said output adjustment means, whereby the total resistance developed by said resistors, comprising the sum of the individual resistances developed by each resistor, remains constant for a particular quantity of liquid;

a voltage compensated electric current-responsive meter directly electrically connected to receive the current output of said sensing assembly and said resistors; and a source of voltage directly electrically connected between the input end of said sensing assembly and the output end of said meter to supply electric current for the operation of said indicator apparatus.

2. The apparatus of claim 1 wherein said variable resistors comprise Bourdon tube gauges.

3. The apparatus of claim 1 wherein said resistor assemblies comprise aneroid bellows.

4. The apparatus of claim 1 wherein said voltage comprises direct current derived from a storage battery.

5. The apparatus of claim 1 wherein said mechanical resistance output adjustment means comprises a rheostat arm disposed in slidable electrical connection with said rheostat to vary the resistance output of said resistor.

* * * * *